L. E. BLUNT.
HAME FASTENER.
APPLICATION FILED JAN. 20, 1917.
1,281,277. Patented Oct. 15, 1918.
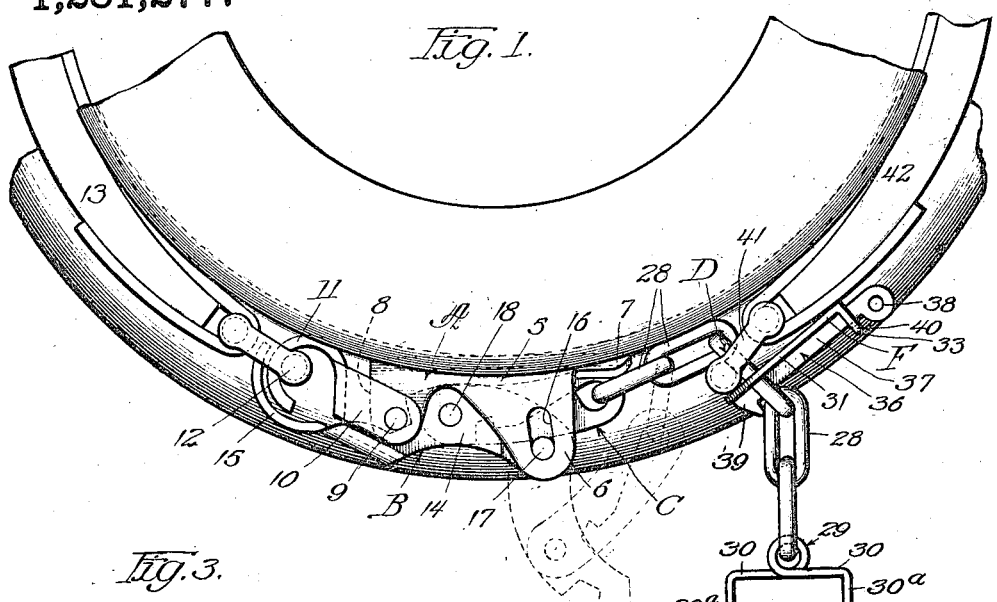
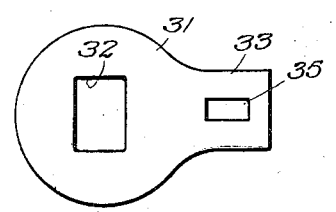
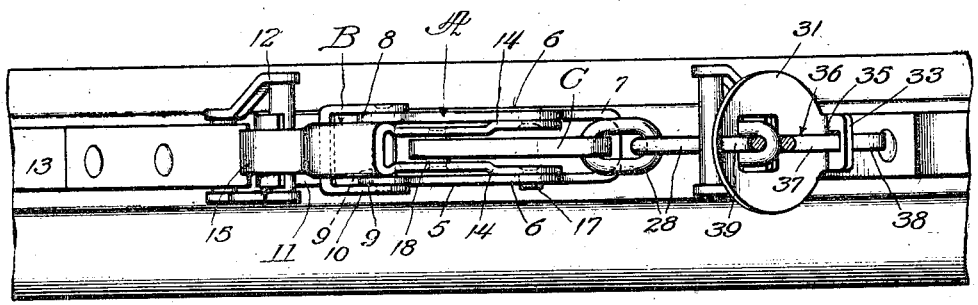
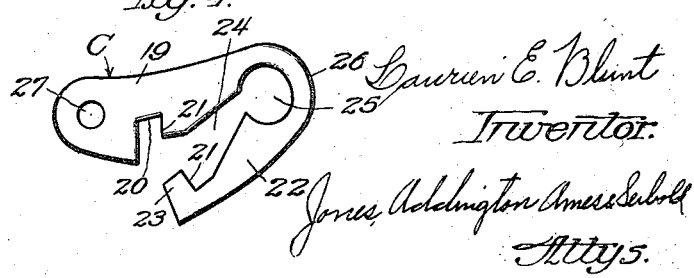

UNITED STATES PATENT OFFICE.

LAURIEN E. BLUNT, OF WILMETTE, ILLINOIS.

HAME-FASTENER.

1,281,277.

Specification of Letters Patent.  Patented Oct. 15, 1918.

Application filed January 20, 1917. Serial No. 143,470.

*To all whom it may concern:*

Be it known that I, LAURIEN E. BLUNT, a citizen of the United States, residing at Wilmette, in the county of Cook and State of Illinois, have invented new and useful Improvements in Hame-Fasteners, of which the following is a full, clear, concise, and exact description, reference being had to the accompanying drawings, forming a part of this specification.

My invention relates to improvements in hame fasteners, and has for its object the production of a device the principal parts of which can be easily stamped or pressed from metal and readily attached and detached from the hame.

A further object is the production of a device the various parts of which are so constructed and assembled as to render it almost impossible for the device to become detached when in use.

A further object is the production of improved means for locking the fastener in any desired position.

A further object is the production of a device that can be cheaply manufactured and is not liable to disarrangement.

These and such other objects as may hereinafter appear are attained by my device, an embodiment of which is illustrated in the accompanying drawing, in which—

Figure 1 represents a view of my improved device locked in position and with a member of the device in unlocked position shown in dotted lines.

Fig. 2 represents a bottom perspective view of the device shown in Fig. 1.

Fig. 3 shows a detail of the locking washer in one stage of its manufacture.

Fig. 4 shows a detail of the connecting link in one stage of its manufacture.

Like numerals of reference indicate like parts in the several figures of the drawing.

Referring now to the drawings, A represents the main supporting member, B represents the tightening and locking lever, C represents the connecting link, D represents the extension chain and stop, F represents the chain locking member.

These letters apply in general terms to the parts referred to above and all of these parts are necessary and used in a complete fastener.

The member A comprises a body member 5 preferably formed from pressed or stamped metal, with outwardly projecting ears or lugs 6, and an extended rear portion 7. The member is curved as shown in Fig. 1 and at the forward end two other short ears 8 are provided. A pin or rivet 9 passes through openings in the lower portion of the ears 8, and the yoke 10 of a hook member 11 is rigidly riveted on said pin. The hook member 11 is adapted to pass over the ring 12 of one of the hames 13.

The hook lever B comprises a yoke member 14 and terminates in a hook 15 adapted to be passed up and around the outer surface of the hook 11 when the fastener is in operative position. The lever is mounted within a pair of elongated, vertically disposed slots 16 in the body member by means of guiding pins 17 in the ears 6. A pin 18 passes through the yoke member 14, and on this pin is pivotally mounted the connecting link C.

This link is shown in one stage of its manufacture in Fig. 4, in which it is illustrated as stamped from a single piece of metal in two integral parts, a main portion 19 provided with a recess 20 having a shoulder 21. The other portion 22 is provided with a projecting leg or boss 23 adapted to enter the recess 20 when the members 19 and 22 are forced together.

It will be noted that the opening portion 24 terminates in a circular opening 25, so when the members 19 and 22 are forced together, the circular portion opening 25 is contracted, and the lug or ear 23 swings about the outer periphery 26 of the circular end of the member, and the side 27 rests against the shoulder 21 as shown in dotted lines in Fig. 1, in which position any pull exerted on the member simply tends to press the ear 23 tightly against the shoulder 21. One end of this link is provided with a circular opening 27 through which the pin or rivet 18 passes, and the circular opening 25 is adapted to receive one of the links 28 of the chain D.

The chain member comprises a plurality of links 28 with a locking member 29 on the outer link comprising a straight piece of wire or metal bent into a loop with laterally extending ends 30—30 forming a bar, provided with down-turned ends 30$^a$. The provision of these down-turned ends prevents the bar from slipping through the locking washer hereinafter described as, if the chain is suddenly pulled through, the shoulders or up-turned portions of the safety stop bar prevent the bar from passing through.

In order to form a stop and lock for the device when in position, I provide a locking washer 31 formed from a circular piece of metal with an opening 32 and an extended ear 33 having an opening 35 preferably quadrangular, through which a locking pin 36 is passed. The locking pin comprises a straight portion 37, an enlarged end or handle 38 and an enlarged hook end 39.

It will be noted that the size of the body portion 37 is such that it fits readily within the opening 35 when the washer is flat, but when the ear 33 is bent upwardly at right-angles to the body as shown at 40 in Fig. 1, the length of the opening 35 is reduced by the bending, so that the remaining opening is such that the pin member passes loosely back and forth, but cannot pass outside of the washer by reason of the engagement of the hook member against the abutting face of the upturned ear on one side and the enlarged ring portion at the other end abutting the opposite face of the ear.

Referring now to the operation of my device, the hook 11 is put over the link 12 on the hame 13, with the lever and chain hanging. The chain B is detached from the locking washer and passed through the link 41 on the bottom of the opposite hame 42. The locking washer F is then slipped over the bar and the chain pulled up fairly tight, the washer F being pressed snugly against the outer face of the hame 42, with the ear 40 uppermost. The pin 36 is then slipped through the link locking the device fairly tightly in position as shown in Fig. 1.

When the chain is first passed through the link 41, the locking lever B and connecting link C are in the position shown in dotted lines in Fig. 1, but when the chain is pulled by hand and the locking washer secured in place, the locking lever is swung upwardly on the pivot 17 and the pivot slides to the top of the slot 16. The locking lever is then grasped in the hand and swung outwardly and upwardly. In the first quarter of the revolution the pin 17 bears against the upper edge of the groove 16, but as the lever passes vertically and commences to swing upwardly, the pin 17 slides down in the groove until it reaches the bottom as shown in full lines in Fig. 1, th hook 15 being passed up over the outer surface of the hook 11, and the ends of the hames being pulled tightly together. As the line of draft between the ends of the hames passes above the pin as it lies in the bottom part of the slot, the entire mechanism is securely locked in position and no amount of pressure or vibration can cause it to unlock.

The only way that the device can be unlocked is to press down on the top of the hook 15 raising the member A until the pivotal point B rises above the line of draft, at which moment the pull throws the hook back and loosens the device, the pin 17 rising to the upper end of the slot 16.

In this device I have corrected a great many faults present in most other fasteners now on the market, and have made one that is practically fool-proof, with no parts to get out of order and loose, and constructed in a strong and durable manner, and one that is perfectly adjustable, fitting all sorts and size of hames now in use. While I have shown a specific construction, there are numerous modifications that would occur to those skilled in the art which would come within the spirit of my invention.

Having thus described my invention, what I claim as new and desire to secure by Letters Patent is:

1. A device of the character described comprising a main body member provided with a hook adapted to engage one side of a hame, a tightening lever slidably mounted in said main member, a chain adapted to be secured to the opposite hame, and means for connecting said chain to said tightening lever, said connecting means comprising an integral strip of metal having a portion cut away forming a shoulder on one side and a groove on the other forced together under pressure so that the shoulder is locked within the groove.

2. A device of the character described comprising a main body member provided with a hook adapted to engage one side of a hame, a tightening lever slidably mounted in said main member, a chain adapted to be secured to the opposite hame, means for securing said chain to said tightening lever, and a locking washer mounted on said chain provided with a locking pin adapted to engage any desired link.

3. A device of the character described comprising a main body member provided with a hook adapted to engage one side of a hame, a tightening lever slidably mounted in said main member, a chain adapted to be secured to the opposite hame, means for securing said chain to said tightening lever, a locking washer formed with an opening through which said chain may pass, an ear upturned on one side of said washer provided with a slot, a locking pin locked within said slot and adapted to enter any desired link regulating the tension of the device.

4. A device of the class described comprising a main body member terminating in a hook portion, slotted ears projecting from said main portion, a tightening lever with a hook end movably mounted within the slots in said ears, a chain movably mounted on said lever below its connection with said slot, and locking means mounted on said chain adapted to engage any desired link thereof.

5. In a device of the class described, a combination of a main body member having a hook end adapted to engage the lower end of a hame, a tightening lever slidably mounted within a vertical slot in said body member, said lever terminating in a hook adapted to be swung about the hook end of said body member, a chain one end of which is connected to said tightening lever by a connecting link and the other end adapted to be secured to the end of the opposite hame, the pivotal connection between said tightening lever and the main member being so positioned as to hold said members together when the device is in locked position.

6. In a device of the class described, a combination of a main body member having a hook end adapted to engage the lower end of a hame, a tightening hook slidably mounted within a vertical slot in said body member, said lever terminating in a hook adapted to be swung about the hook end of said body member, a chain one end of which is connected to said tightening lever by a connecting link, and the other end adapted to be secured to the end of the opposite hame, the pivotal connection between said tightening lever and the main member being so positioned as to hold said members together when the device is in locked position, and a locking washer adapted to lock the chain at any desired point on said opposite hame.

7. A device of the character described comprising a main body member provided with a hook adapted to engage one side of a hame, a tightening lever slidably mounted in said main member, a chain adapted to be secured to the opposite hame, a safety stop comprising a bar mounted on the end of said chain provided with upturned ends, means for securing said chain to said tightening lever, and a locking washer mounted on said chain provided with a locking pin adapted to engage any desired link.

In witness whereof, I have hereunto subscribed my name.

LAURIEN E. BLUNT.

Witnesses:
J. B. STALEY,
E. KANE.

Copies of this patent may be obtained for five cents each, by addressing the "Commissioner of Patents, Washington, D. C."